United States Patent [19]

Höhne

[11] 4,091,175
[45] May 23, 1978

[54] AIR ELECTRODE FOR ELECTROCHEMICAL CELLS

[75] Inventor: Karl Höhne, Erlangen, Germany

[73] Assignee: Siemens Aktiengesellschaft, Munich, Germany

[21] Appl. No.: 738,887

[22] Filed: Nov. 4, 1976

[30] Foreign Application Priority Data

Nov. 5, 1975 Germany .......................... 2549621

[51] Int. Cl.² .................... H01M 4/32; H01M 4/96
[52] U.S. Cl. ................................................. 429/40
[58] Field of Search ............................. 429/40, 59

[56] References Cited

U.S. PATENT DOCUMENTS

| 3,108,908 | 10/1963 | Krebs | 429/59 |
| 3,207,682 | 9/1965 | Oswin et al. | 429/40 |
| 3,253,961 | 5/1966 | Jung et al. | 429/40 |
| 3,867,199 | 2/1975 | Dunlop et al. | 429/59 |

Primary Examiner—John H. Mack
Assistant Examiner—H. A. Feeley
Attorney, Agent, or Firm—Kenyon & Kenyon, Reilly, Carr & Chapin

[57] ABSTRACT

An air electrode for electrochemical cells, particularly for fuel cells with an alkaline electrolyte, which contains silver coated carbon as the catalytic material in which the catalytic material also contains nickel hydroxide, the nickel content being up to about 2% by weight, with the weight ratio of silver to carbon preferably about 1:1.

1 Claim, 1 Drawing Figure

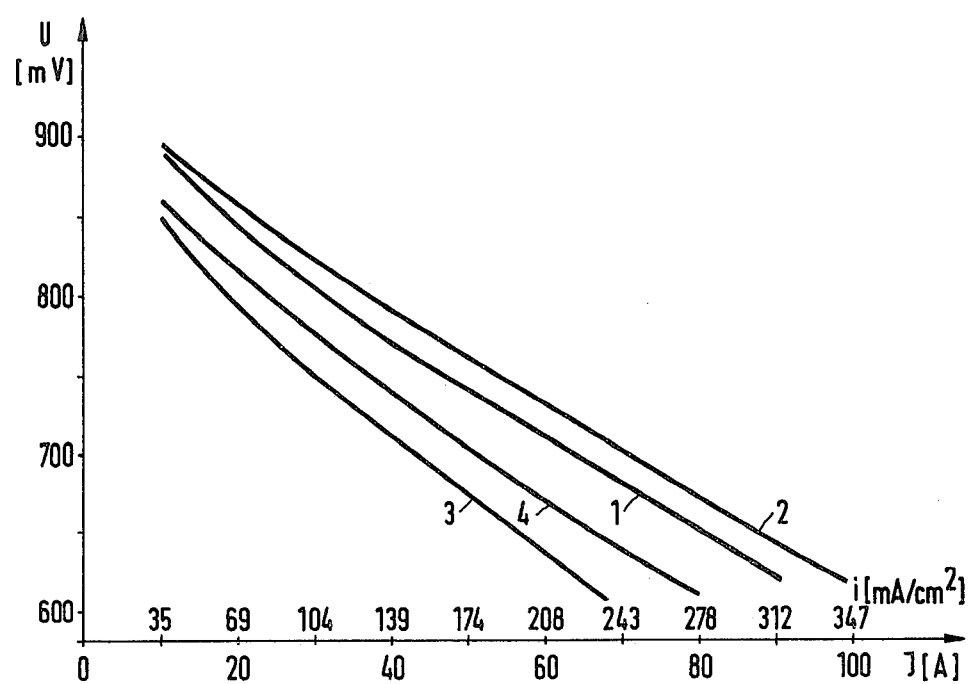

AIR ELECTRODE FOR ELECTROCHEMICAL CELLS

BACKGROUND OF THE INVENTION

This invention relates to electrochemical cells in general and more particularly to an improved air electrode for electrochemical cells, particularly fuel cells with an alkaline electrolyte containing silver coated carbon as the catalytic material.

The use of carbon coated with noble metals, such as silver, as the cathode material i.e., for oxygen reduction, in fuel cells is known. Although such electrode material has been found usable in fuel cells operated with hydrogen and oxygen, it is less suited for air operation, i.e, if air is used instead of oxygen. For, replacing oxygen by air causes, as it does with other cathode materials, a decrease of the electrode potential by about 100 mV.

SUMMARY OF THE INVENTION

It is therefore an object of the present invention to reduce the polarization of air electrodes which have silver coated carbon as the catalytic material.

According to the present invention, this is achieved by adding nickel hydroxide to the catalytic material, the nickel content being up to about 2% by weight.

Due to the addition of nickel hydroxide, the air electrode according to the present invention exhibits a substantial improvement in its electrical characteristic. It is of importance that the nickel content of the catalytic material, i.e., the mixture of carbon, silver and nickel hydroxide, be a maximum of about 2% by weight. The nickel content is referred to the total weight of the catalytic material. If the content is higher, the electrical characteristics fall off again. Silver plated carbon with a content of 2.3% nickel again shows about the same values as silver plated carbon without the nickel hydroxide addition. With a content of 2.7% nickel, the values are even lower, i.e., a degradation takes place.

The weight ratio of silver to carbon is preferably about 1:1 in the air electrode according to the present invention, i.e., the silver content of the electrode is approximately 50% by weight. Such electrodes exhibit the best electrical characteristics.

To manufacture the air electrode according to the present invention, or to manufacture the catalytic material for this electrode, carbon can be impregnated with solutions of a silver salt, a nickel salt and formaldehyde. The solutions are finally separated and the wet carbon is placed in an alkaline solution, where the reduction of the silver salt to metallic silver takes place and nickel hydroxide is formed at the same time. However, the silver salt reduction can also be performed separately from the formation of nickel hydroxide. After the reduction is finished, as can be recognized by the cessation of the gas development, the mixture of solids, i.e., the mixture of carbon silver and nickel hydroxide, is separated, washed until neutral and dried. The catalytic material obtained by this process is formed into an electrode in a suitable manner.

It is advantageous, however, to manufacture the electrode according to the present invention in such a way that the carbon is impregnated with a solution containing a silver salt, particularly silver nitrate, a nickel salt, particularly nickel nitrate and formaldehyde and the wet substance so obtained is suspended in methanol. To this suspension, alkali solution, such as potassium hydroxide, is added and the electrode is formed from the resulting mixture of carbon, silver and nickel hydroxide. Asbestos and/or a binder may optionally be added.

BRIEF DESCRIPTION OF THE DRAWING

The single FIGURE is a curve illustrating the electrical characteristics of various electrodes.

DETAILED DESCRIPTION OF THE INVENTION

In accordance with the present invention, 70 g $AgNO_3$ and 5 g $Ni(NO_3)_2 \cdot 6H_2O$ are dissolved in 75 ml water. To this solution 50 ml formalin is added, i.e., an aqueous 35% formaldehyde solution. Subsequently, 20 g of activated carbon are added and the mixture is stirred for 2 hours. Thereupon, the carbon is separated from the aqueous solution, the filter cake being left moist, however. The moist carbon is suspended in 200 ml methanol and 200 ml 6 m KOH is slowly added to this suspension while stirring. After the reduction is finished, the mixture of carbon, silver and nickel hydroxide is separated by filtration, washed with methanol until neutral and dried at 140° C. The carbon catalyst prepared in this manner has a silver content of about 50% by weight and a nickel content of about 0.76% by weight, as an analysis has shown.

The nickel and silver content of the catalytic material can be adjusted by means of the nickel and silver concentration of the starting solution. If, under otherwise the same reaction conditions, the nickel nitrate content of the solution is 10 or 20 g instead of 5 g, a carbon catalyst with nickel contents of about 1.92% by weight and 2.7% by weight respectively are obtained.

Preparation of the Air Electrode

Air electrodes that can be handled are prepared by a sedimentation process in the following manner. First, 0.2 g of asbestos fibers are treated in 500 ml water by means of a turbo stirrer. The aqueous asbestos fiber suspension obtained is reacted, while stirring, with 4 g of an aqueous 60% polytetrafluoroethylene latex. To this asbestos fiber/binder suspension are added 20 g of the carbon catalyst, i.e. the mixture of carbon, silver and nickel hydroxide. The suspension so obtained is poured into a film former with an inside diameter of about 21 cm, equipped with a filter paper. The suspension is briefly fanned up with a vibrator and is then allowed to settle. Thereupon, the water is drawn off and the filter paper with the filter cake is dried for 2 hours at 120° C. After drying, the filter paper is pulled off. A foil electrode of very good mechanical stability is obtained in this manner. This electrode contains, per $cm^2$, 22 mg carbon catalyst, 6 mg polytetrafluoroethylene and 0.5 mg asbestos.

Determining the Catalytic Activity

The catalytic activity of the air electrodes according to the present invention was tested in a full cell arrangement. For this purpose, a fuel cell with an active electrode area of about 288 $cm^2$ was used. A sedimented electrode of Raney nickel was used as the anode. The cell voltage of such a fuel cell served as a measure of the catalytic activity of the air electrode according to the invention. 6 m KOH was used as the electrolytic liquid at an operating temperature of 80 to 85° C. The operating air pressure was about 12.5 $N/cm^2$ and the air throughput was about twice the stoichiometric consumption.

In the FIGURE, the current-voltage characteristics of air operated fuel cells with the air electrode according to the present invention are shown. The current density $i$ in mA/cm$^2$ or the current I in A is plotted on the abscissa, and on the ordinate, the voltage U in mV. Curves 1 to 3 were obtained using air electrodes with a nickel content of about 0.76, 1.92 and 2.70% by weight, respectively. For comparison, Curve 4 shows a characteristic which was obtained with an air electrode which contained only silver plated carbon.

It will be seen from the FIGURE that the best electrical characteristics are obtained with a nickel content of about 2% by weight, (Curve 2). Even a smaller nickel content brings about a distinct improvement. For nickel contents which are clearly above 2% by weight, the electrical data becomes worse again, however.

The air electrode according to the present invention can also be used in other electrochemical cells, e.g., in metal/air cells in addition to its use in fuel cells.

I claim:

1. In an air electrode for electrochemical cells containing silver coated carbon as a catalytic material the improvement comprising:
   the catalytic material also containing nickel hydroxide with the nickel content being up to about 2% by weight and the weight ratio of silver to carbon in said catalytic material about 1:1.